(12) United States Patent
Lawrence et al.

(10) Patent No.: US 6,769,392 B2
(45) Date of Patent: Aug. 3, 2004

(54) VARIABLE VALVE TIMING IN A HOMOGENOUS CHARGE COMPRESSION IGNITION ENGINE

(75) Inventors: Keith E. Lawrence, Peoria, IL (US); James J. Faletti, Spring Valley, IL (US); Steven J. Funke, Princeville, IL (US); Ronald P. Maloney, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 215 days.

(21) Appl. No.: 10/029,416

(22) Filed: Dec. 20, 2001

(65) Prior Publication Data

US 2003/0116124 A1 Jun. 26, 2003

(51) Int. Cl.[7] ................................................. F02D 5/00
(52) U.S. Cl. .................. 123/305; 123/90.16; 123/90.43
(58) Field of Search .............................. 123/305, 90.16, 123/90.46, 90.63, 90.43

(56) References Cited

U.S. PATENT DOCUMENTS

| 5,144,928 A | 9/1992 | Komurasaki |
| 5,713,315 A | 2/1998 | Jyoutaki et al. |
| 5,832,880 A | 11/1998 | Dickey |
| 5,875,743 A | 3/1999 | Dickey |
| 6,085,705 A * | 7/2000 | Vorih ........................ 123/90.12 |
| 6,293,237 B1 * | 9/2001 | Vorih ........................ 123/90.12 |
| 6,439,195 B1 * | 8/2002 | Warner ........................ 123/321 |
| 6,510,824 B2 * | 1/2003 | Vorih et al. .............. 123/90.12 |

FOREIGN PATENT DOCUMENTS

| WO | WO 98/07973 | 2/1998 |
| WO | WO 98/10179 | 3/1998 |
| WO | WO 99/42718 | 8/1999 |

* cited by examiner

*Primary Examiner*—Bibhu Mohanty
(74) *Attorney, Agent, or Firm*—Liell & McNeil

(57) ABSTRACT

The present invention relates generally to the field of homogenous charge compression ignition engines, in which fuel is injected when the cylinder piston is relatively close to the bottom dead center position for its compression stroke. The fuel mixes with air in the cylinder during the compression stroke to create a relatively lean homogeneous mixture that preferably ignites when the piston is relatively close to the top dead center position. However, if the ignition event occurs either earlier or later than desired, lowered performance, engine misfire, or even engine damage, can result. The present invention utilizes internal exhaust gas recirculation and/or compression ratio control to control the timing of ignition events and combustion duration in homogeneous charge compression ignition engines. Thus, at least one electro-hydraulic assist actuator is provided that is capable of mechanically engaging at least one cam actuated intake and/or exhaust valve.

11 Claims, 7 Drawing Sheets

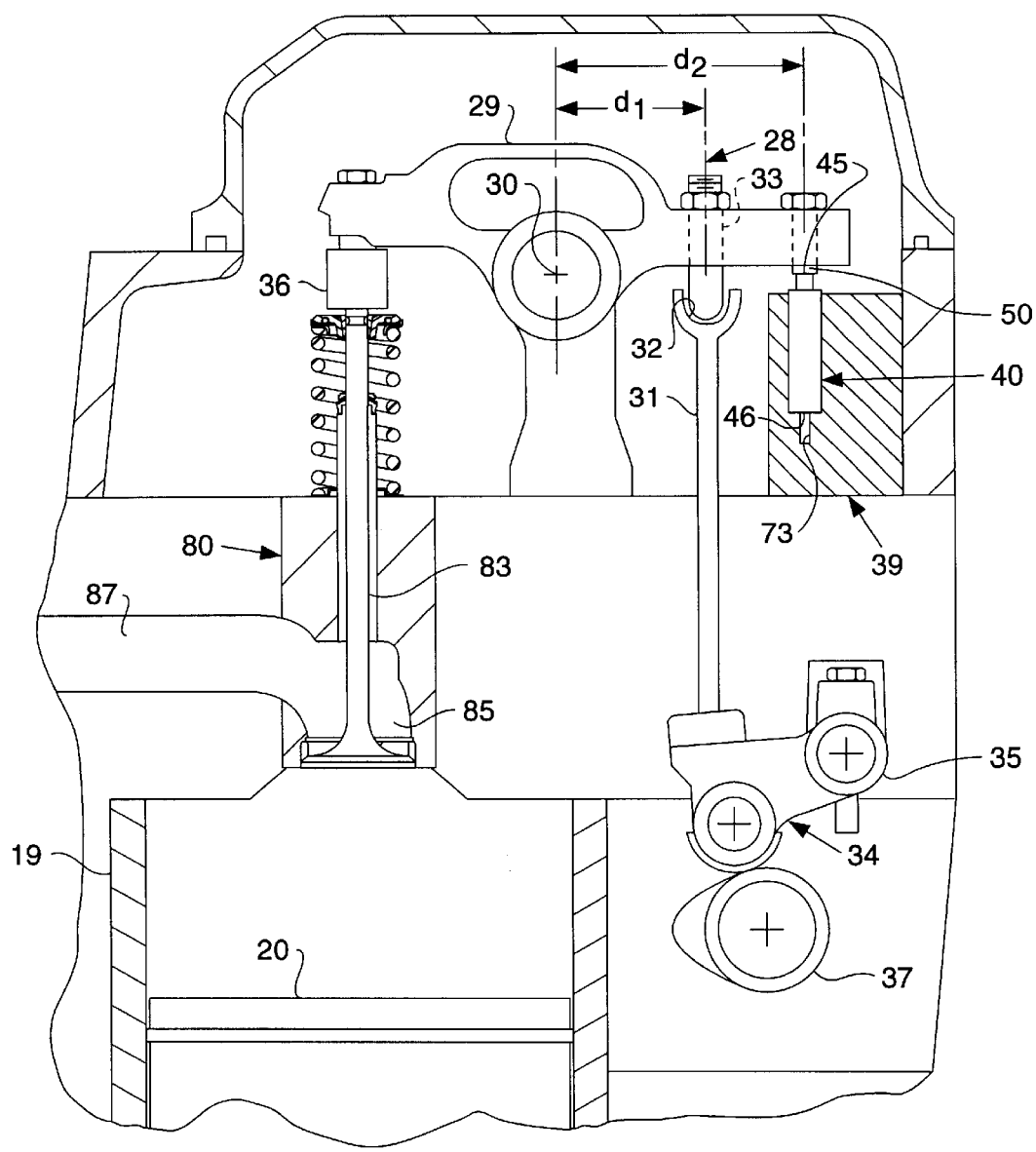
Fig_2_

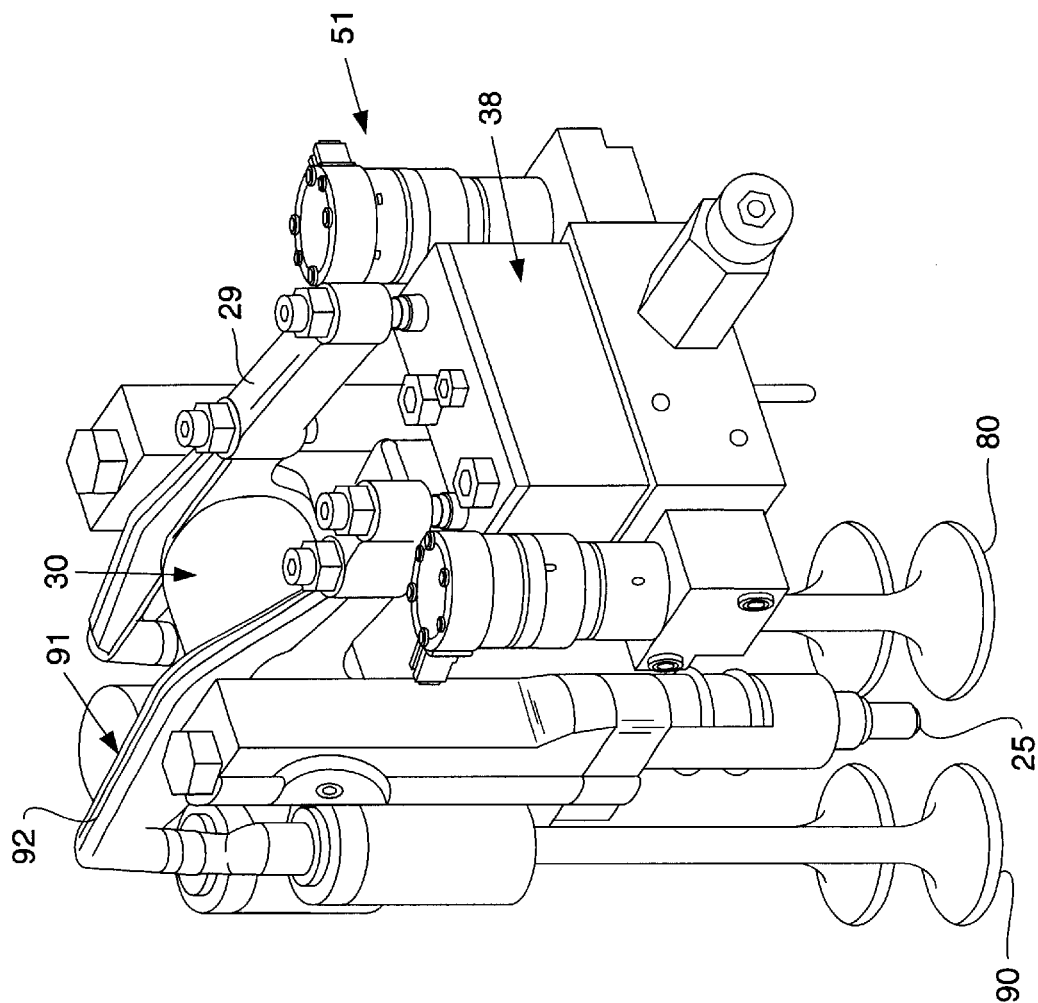
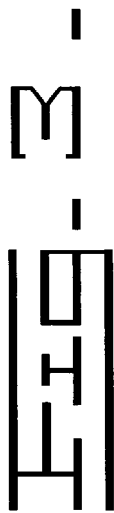

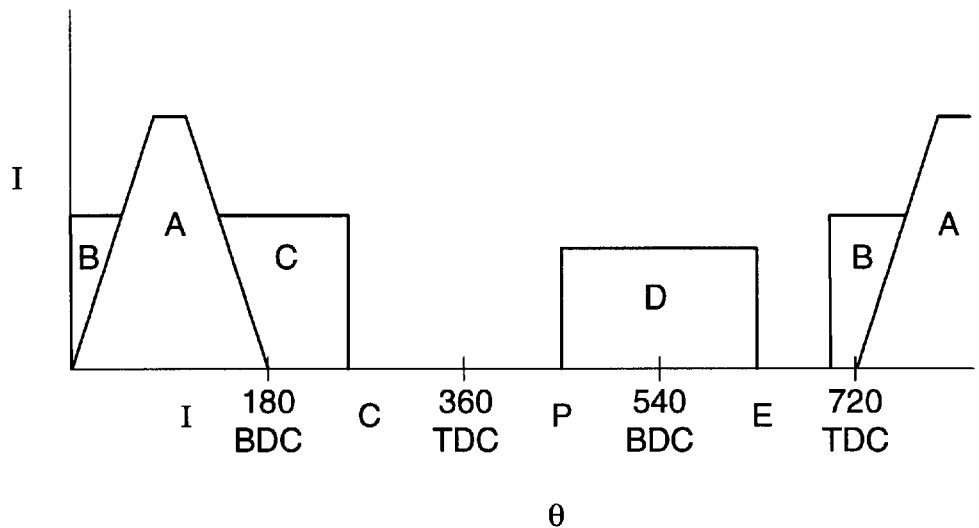
Fig_6a_
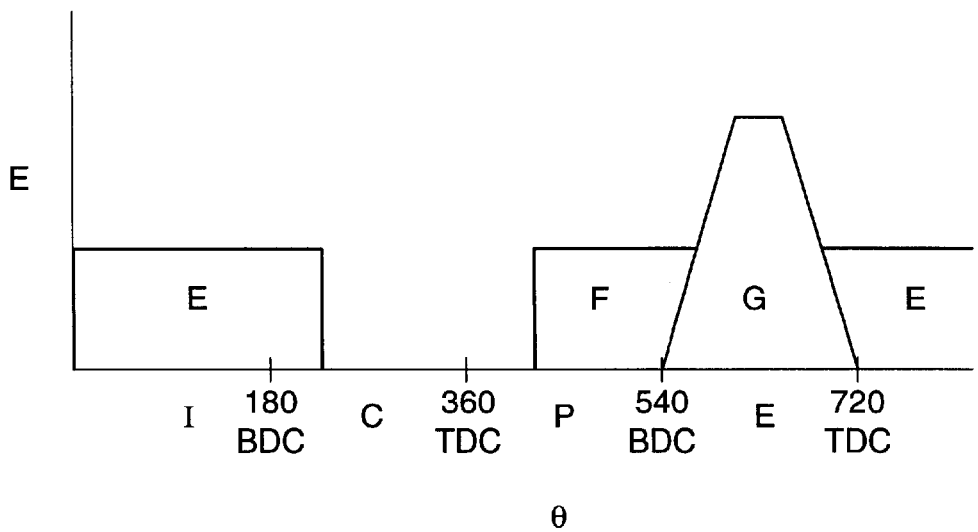
Fig_6b_

VARIABLE VALVE TIMING IN A HOMOGENOUS CHARGE COMPRESSION IGNITION ENGINE

GOVERNMENT LICENSE RIGHTS

The U.S. Government has a paid-up license in this invention and the right in limited circumstances to require the patent owner to license others on reasonable terms as provided for by the terms of DE-FC05-97OR22605, awarded by the Department of Energy. In other words, this invention was made with Government support under DE-FC05-97OR22605 awarded by the Department of Energy. The Government has certain rights in this invention.

TECHNICAL FIELD

The present invention relates generally to valve assemblies, and more particularly to valve assemblies for a homogenous charge compression ignition engines.

BACKGROUND

A common method of achieving homogenous charge compression ignition is to include at least one fuel injector that injects fuel into its respective engine cylinder when the cylinder piston is relatively far from a top dead center position during a compression stroke. The fuel then mixes with air in the cylinder during the compression stroke to form a relatively lean homogeneous fuel/air mixture. For certain engine operating conditions, this type of engine operation can result in combustion that produces less undesirable emissions than typical diesel engine operation. However, it should be appreciated that, because the injected fuel does not immediately ignite, timing of the ignition during homogenous charge compression ignition engine operation is critical. In other words, it is desirable that the ignition event occur when the cylinder piston reaches or nears the top dead center position for its compression stroke. When the start of ignition occurs too soon, the fuel and air mixture will burn during the compression stroke of the cylinder piston, resulting in possible engine damage and poor cycle efficiency. In addition, this could lead to high temperatures during the next engine cycle, which could result in another early start of ignition.

Numerous attempts have been made to control ignition timing for homogenous charge compression ignition engines. For example, one such attempt is described in U.S. Pat. No. 5,832,880, which issued to Dickey on Nov. 10, 1998, and is entitled Apparatus And Method For Controlling Homogenous Charge Compression Ignition Combustion In Diesel Engines. In Dickey, a closed loop control strategy is disclosed which includes regulation of the ignition timing via an amount of water that is injected into a cylinder of a homogenous charge compression ignition engine. While this purported solution may have some viability, there is still room for improvement. For instance, for those engines that do not utilize water-spraying fuel injectors, a solution to controlling timing of ignition events and duration of the combustion events is needed.

The present invention is directed to overcome one or more of the problems as set forth above.

SUMMARY OF THE INVENTION

In a first aspect of the present invention, a homogenous charge compression ignition engine includes an engine housing that defines a plurality of engine cylinders, wherein each of the plurality of engine cylinders includes a moveable piston that reciprocates between a top dead center position and a bottom dead center position. A fuel injector is provided for each engine cylinder and is operable to inject fuel into the engine cylinder when the piston is closer to the bottom dead center position than the top dead center position. At least one intake valve is provided for each said engine cylinder. A cam is sized and positioned such that it can mechanically engage the at least one intake valve. An electro-hydraulic assist actuator is able to mechanically engage the at least one intake valve.

In another aspect of the present invention, a method of operating an engine includes a step of injecting fuel into an engine cylinder when a cylinder piston is closer to a bottom dead center position than a top dead center position. At least one gas exchange valve is held open, at least in part by a rotating cam mechanically engaging the at least one gas exchange valve. Ignition timing is adjusted, at least in part by actuating an electro-hydraulic assist actuator that is able to mechanically engage the at least one gas exchange valve.

In yet another aspect of the present invention, a valve assembly includes at least one gas exchange valve. A rotating cam is provided that is mechanically engageable with the at least one gas exchange valve. An electro-hydraulic assist actuator is provided that includes a movable plunger and is capable of engaging the at least one gas exchange valve.

BRIEF DESCRIPTION OF THE DRAWINGS

FIG. 2 is a sectioned front diagrammatic view of a cylinder shown in FIG. 1;

FIG. 3 is a diagrammatic isometric view of a valve assembly shown in FIG. 1;

FIG. 6a is a graphical representation of cam determined intake valve movement and potential electro-hydraulic intake valve movement versus crank angle for four cycle operation of the engine shown in FIG. 1;

FIG. 6b is a graphical representation of cam determined exhaust valve movement and potential electro-hydraulic exhaust valve movement versus crank angle for four cycle operation of the engine shown in FIG. 1;

DETAILED DESCRIPTION

Figure 1:
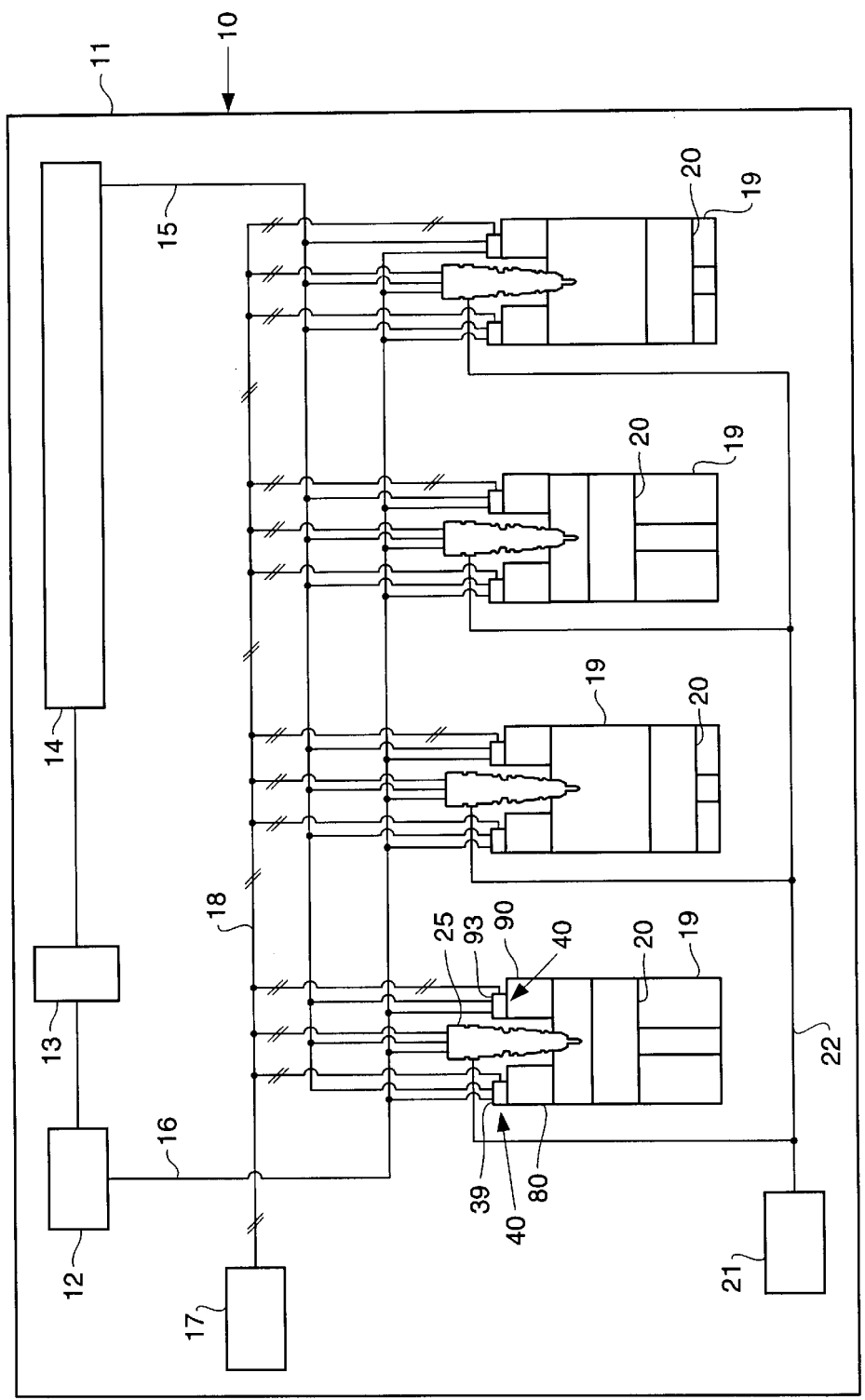
FIG. 1 is a schematic view of an engine according to the present invention.

Referring to FIG. 1 there is shown an engine 10 according to the present invention. A low pressure reservoir 12 is provided in engine 10 and preferably includes an amount of low pressure engine lubricating oil. While low pressure reservoir 12 is preferably an oil pan that has an amount of engine lubricating oil, it should be appreciated that other fluid sources having an amount of available fluid, such as coolant, transmission fluid, or fuel, could instead be used. A high pressure pump 13 pumps oil from low pressure reservoir 12 and delivers the same to high pressure manifold 14. High pressure oil flowing out of high pressure manifold 14 is delivered via high pressure fluid supply line 15 to a hydraulic system provided in engine 10, and oil is returned to low pressure reservoir 12 via low pressure return line 16 after it has performed work in the hydraulic system. Engine 10 also provides an engine housing 11 that defines a plurality of engine cylinders 19.

Each cylinder 19 defined by engine housing 11 has a movable piston 20. Each piston 20 is movable between a bottom dead center position and a top dead center position for a typical four cycle homogenous charge compression ignition engine 10; the advancing and retracting strokes of piston 20 correspond to the four stages of engine 10 operation. When piston 20 retracts from its top dead center position to its bottom dead center position for the first time, it is undergoing an intake stroke and air can be drawn into cylinder 19 via an intake valve 80. When piston 20 advances from its bottom dead center position to its top dead center position for the first time it is undergoing a compression stroke. During the compression stroke, when piston 20 is closer to its bottom dead center position than its top dead center position, fuel from fuel source 21 via fuel supply line 22, is preferably injected into cylinder 19 via a fuel injector 25. Timing of this fuel injection event is preferably controlled by an electrical actuator that is located inside injector 25 and electronically coupled to electronic control module 17 via a communication line 18. While piston 20 advances toward its top dead center position during the compression stroke, fuel and air within cylinder 19 are mixed into a relatively lean homogeneous mixture. At around the end of the compression stroke, when piston 19 is relatively close to its top dead center position, the fuel and air mixture within cylinder 19 preferably ignites, which drives piston 20 downward toward the bottom dead center position for its power stroke. Finally, when piston 20 once again advances from its bottom dead center position to its top dead center position, post combustion products remaining in cylinder 19 can be vented via an exhaust valve 90, corresponding to the exhaust stroke of piston 20. While engine 10 has been illustrated as a four cycle, four cylinder homogenous charge compression ignition engine, it should be appreciated that any desired number of cylinders can be defined by engine housing 11. In addition, it should be appreciated that engine 10 could instead be a two cycle homogenous charge compression ignition engine.

Referring in addition to FIGS. 2 and 3, each cylinder 19 provides a number of gas exchange valves, preferably including two intake valves 80 and two exhaust valves 90 (FIG. 3). A cam 37 is provided which is positioned to mechanically engage intake valves 80, preferably via a rocker arm assembly 28. As cam 37 rotates, a lifter assembly 34 is moved upward about lifter group shaft 35. Lifter assembly 34 acts upon rocker arm assembly 28, which includes a rocker arm 29 mounted to pivot about pivot 30 corresponding to rotating movement of cam 37 via a connector rod 31. Thus, cam 37 can mechanically engage an intake valve member 83 movably positioned within each intake valve 80 via rocker arm assembly 28. In addition, a bridge 36 is provided which allows single rocker arm 29 to be mechanically coupled to the intake valve members 83 of two intake valves 80. With each intake stroke of piston 20, intake valve member 83 is driven downward to open cylinder 19 to an intake manifold 87 via an intake passage 85 defined the cylinder head design.

In a similar manner, additional cam lobes (not shown) are provided by engine 10 that can mechanically engage exhaust valves 90, preferably via an exhaust valve rocker assembly 91. Rotation of this exhaust cam can cause an exhaust valve rocker arm 92 to move in a corresponding manner to either open or close exhaust valve 90. Thus, with each exhaust stroke of piston 20, a connection rod (not shown) is driven upward to open cylinder 19 to an exhaust manifold (not shown) via rocker arm 92. However, while rocker arm assembly 28 and rocker arm assembly 91 have been illustrated as the mechanical linkage between intake valves 80 and exhaust valves 90 and their respective cams, it should be appreciated that other linkages could be substituted. For instance, one or both of cam 37 and the exhaust cam could instead be an overhead cam that mechanically engages the respective gas exchange valve via an alternative linkage. In addition, cam 37 and the electro-hydraulic assist actuator could engage rocker arm 29 on opposite sides of pivot 30.

Returning to engine 10, while intake valves 80 and exhaust valves 90 are cam actuated, they can be mechanically engaged by an electro-hydraulic assist intake actuator 39 and an electro-hydraulic assist exhaust actuator 93 (FIG. 4), respectively, provided by a valve assembly 38. As illustrated in FIG. 2, electro-hydraulic assist actuator 39 is preferably a second distance $d_2$ from pivot 30, which is greater than a first distance $d_1$ between pivot 30 and cam 37. In addition, electro-hydraulic assist intake actuator 39 and electro-hydraulic assist exhaust actuator 93 are preferably positioned in parallel with cam 37 and the exhaust cam, respectively.

Figure 4:
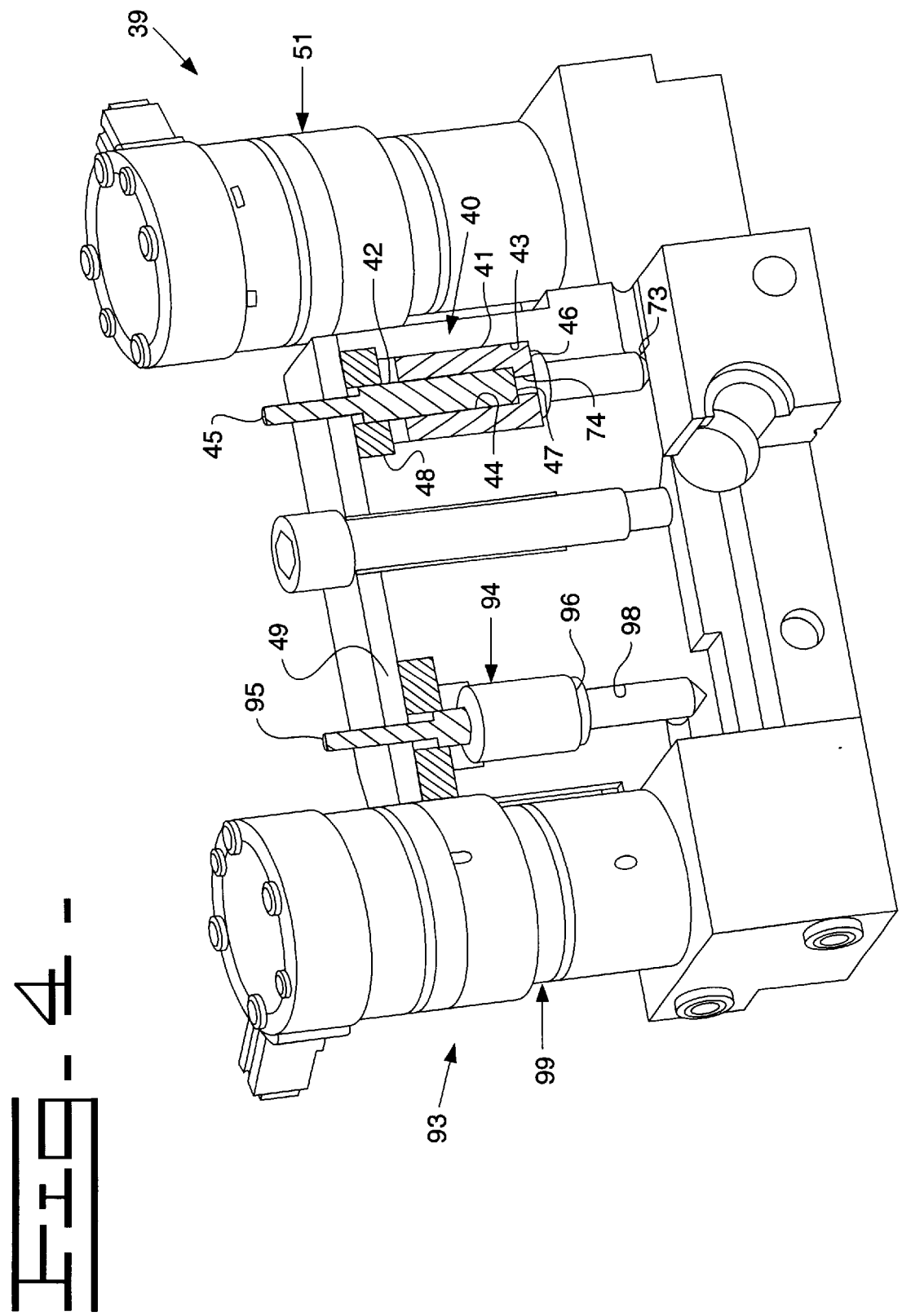
FIG. 4 is a diagrammatic partial isometric view of an electro-hydraulic assist actuator shown in FIG. 2.

Referring in addition to FIG. 4, electro-hydraulic assist intake actuator 39 provides an intake plunger assembly 40 that can engage valve member 83 of intake valves 80 via rocker arm 29 and an adjustment screw 50 (FIG. 2). Preferably, plunger 40 is a two stage plunger that includes a larger diameter outer (first stage) plunger 41 that reciprocates in an outer plunger bore 43 defined by electro-hydraulic assist intake actuator 39 and a smaller diameter inner (second stage) plunger 42 that reciprocates in an inner plunger bore 44 defined in part by outer plunger 41. Outer plunger 41 travels a shorter distance than inner plunger 42, and provides sufficient force to engage rocker arm 29 and open the engine valves when the combustion chamber is pressurized. Movement of outer plunger 41 is limited by a stop component 48. Inner plunger 42 provides sufficient force to hold intake valve 80 open against pressure within cylinder 19 and the valve springs. Stop plate 49 limits the hydraulic assist valve opening travel by providing a mechanical stop for the inner or second stage plunger. While a two stage plunger assembly 40 is preferable to limit excessive valve overshoot, it should be appreciated that a single stage plunger could instead be utilized. Intake plunger assembly 40 is moveable between a downward retracted position and an upward advanced position. When plunger assembly 40 is in its upward, advanced position it can engage rocker arm 29. An intake plunger control passage 73 is defined by electro-hydraulic assist intake actuator 39 and allows hydraulic fluid, such as pressurized engine lubricating oil, to act against plunger 40, to move the same toward its upward position. Hydraulic fluid in intake plunger control passage 73 can act on a hydraulic surface 46 of outer plunger 41, as well as acting on a hydraulic surface 47 of inner plunger 42 via an inner plunger control passage 74. Flow of hydraulic fluid into intake plunger control passage 73 and inner plunger control passage 74 is controlled by a flow control valve 51.

As illustrated in FIGS. 3 and 4, electro-hydraulic assist exhaust actuator 93 provides an exhaust plunger 94 that can engage exhaust valves 90 via contact between engagement surface 95 and an adjustment screw on exhaust rocker arm 92. Exhaust plunger 94 is controlled in movement by an exhaust flow control valve 99 and can engage rocker arm 92 to open exhaust valve 90 to cylinder 19. Exhaust plunger 94 preferably includes an engagement surface 95 that is in contact with a lash adjusting screw in the rocker arm to facilitate engagement of exhaust rocker arm 92 by electro-hydraulic assist exhaust actuator 93. In addition, exhaust plunger 94 also includes a hydraulic surface 96 that is exposed to fluid pressure in an exhaust control passage 98, defined by electro-hydraulic assist exhaust actuator 93. Because electro-hydraulic assist exhaust actuator 93 preferably performs in a manner similar to electro-hydraulic assist intake actuator 39, operation of only one of these actuators will be discussed in detail. Like the intake actuator structure just defined, plunger 94 includes a shoulder that contacts a stop to limit the hydraulic assist valve travel. In addition, while electro-hydraulic assist intake actuator 39 has been illustrated as being positioned outside cam 37 and pivot 30 (FIG. 2), it should be appreciated that it could instead be positioned at another suitable location about rocker arm 29. Thus it should be appreciated that the location of electro-hydraulic assist intake actuator 39 and the length of any push rod should be such that rocker arm 29 can be sufficiently engaged. In addition, it should be appreciated that because electro-hydraulic assist intake actuator 39 is capable of engaging rocker arm 29 at a time when rocker arm 29 may not be engaged by cam 37, a lash adjustment screw 33 is adjustable on rocker arm 29 and mates to a push rod 31, which should be sufficiently long that it remains inserted into a cup 32, even when rocker arm 29 is being lifted by plunger assembly 40. If lift pin 33 is not sufficiently long, and cup 32 sufficiently deep, these components could de-couple during electro-hydraulic assist movement of rocker arm 29, which could potentially result in damage to cam 37 and engine 10.

Figure 5:
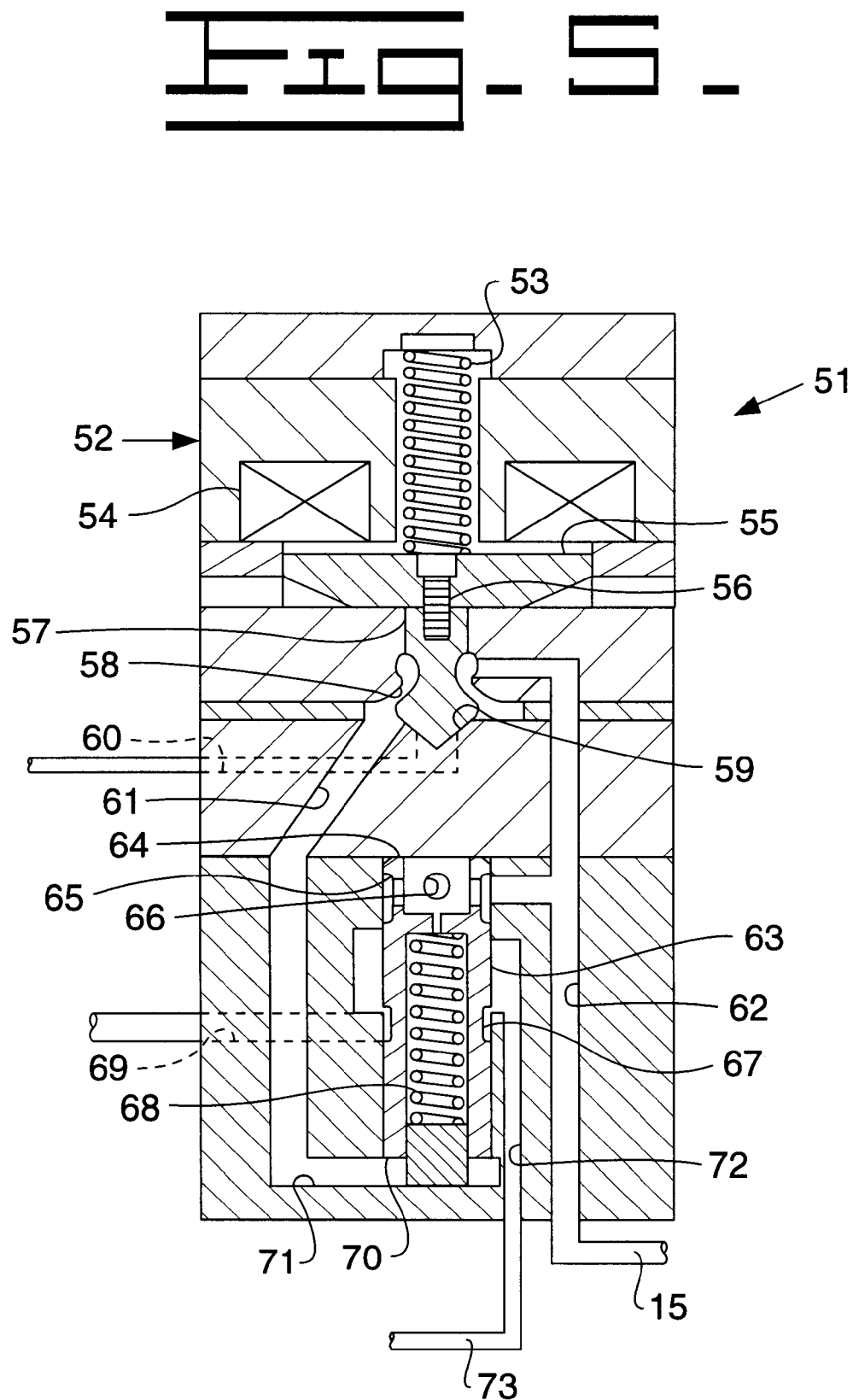
FIG. 5 is a sectioned side diagrammatic view of a flow control valve for the electro-hydraulic assist actuator shown in FIG. 3.

Referring now to FIG. 5, there is shown a sectioned side diagrammatic view of flow control valve 51. Flow control valve 51 preferably includes a solenoid 52 that provides a biasing spring 53, a coil 54, and an armature 55. Preferably, a pilot valve 57 is mechanically coupled to armature 55 via a pin 56. Pilot valve member 57, is moveable between a high pressure seat 58 and a low pressure seat 59. Pilot valve member 57 is biased toward its downward position, closing low pressure seat 59, by biasing spring 53. When solenoid 52 is energized, pilot valve member 57 and armature 55 are lifted to an upward position, such that pilot valve member 57 closes high pressure seat 58 and opens low pressure seat 59.

Also provided by flow control valve 51 is a spool valve member 63. Spool valve member 63 provides a high pressure surface 64 which is constantly exposed to high pressure fluid in a high pressure passage 62 defined by flow control valve 51. High pressure fluid flows to high pressure surface 64 via a high pressure annulus 65 and a plurality of radial passages 66 all defined by spool valve member 63. Spool valve member 63 is moveable between a retracted upward position and an advanced downward position, and is biased toward its upward position by a biasing spring 68. When pilot valve member 57 is in its downward position, such as when solenoid 52 is de-energized, high pressure seat 58 is open and high pressure fluid in high pressure passage 62 can flow into a spool cavity 71 via a variable pressure passage 61. High pressure fluid can then act on a control surface 70, which is included on spool valve member 63 and positioned in opposition to high pressure surface 64, thus causing spool valve member 63 to be hydraulically balanced. When spool valve member 63 is hydraulically balanced as such, it will remain in, or move toward, its upward retracted position under the action of biasing spring 68. When spool valve member 63 is in its upward, biased position, a device control passage 72, defined by flow control valve 51, is fluidly connected to a low pressure passage 69 via a low pressure annulus 67 defined by spool valve member 63. When low pressure is acting in device control passage 72 and intake plunger control passage 73, intake plunger 40 (FIG. 4) will remain in its downward position.

When pilot valve member 57 is in its upward position, such as when solenoid 52 is energized, high pressure seat 58 is closed and spool cavity 71 is open to a low pressure passage 60 via variable pressure passage 61. With low pressure acting on control surface 70 and spool cavity 71, spool valve member 63 is no longer hydraulically balanced, and the high pressure hydraulic fluid acting on high pressure surface 64 is sufficient to move spool valve member 63 downward against the action of biasing spring 68. When spool valve member 63 is in its downward position, device control passage 72 is fluidly connected to high pressure passage 62 via high pressure annulus 65. When high pressure hydraulic fluid is acting in device control passage 72 and intake plunger control passage 73, intake plunger 40 (FIG. 4) can be moved toward its upward position to engage rocker arm 29. It should be appreciated, however, that the high pressure acting on intake plunger 40 will not be sufficient to move intake plunger 40 upward to engage rocker arm 29 at all times during the operation of engine 10.

The present invention preferably utilizes electro-hydraulic assist intake actuator 39 to alter the timing of intake valve 80 and/or exhaust valve 90 opening and closing to adjust ignition timing and/or combustion duration within cylinder 19. For instance, electronic control module 17 can continuously monitor one or more engine operating conditions during operation of engine 10. These operating conditions can include, but are not limited to, load demand, manifold pressure, intake temperature, and mass air flow. By evaluating one or more of these engine operating conditions, electronic control module 17 can determine if ignition timing and/or combustion duration should be altered by variable valve timing.

To advance ignition timing, or to expand combustion duration, engine 10 will preferably undergo internal exhaust gas recirculation. To perform internal exhaust gas recirculation, electro-hydraulic assist intake actuator 39 will preferably be activated to open intake valve 80 during a portion of the exhaust stroke of piston 20 prior to the ignition event to be altered. This will allow a portion of the relatively hot exhaust gases to be pushed into intake manifold 87. When intake valve 80 is subsequently re-opened for the intake stroke of piston 20, the relatively hot exhaust gasses can be returned to cylinder 19 via intake passage 85, thus raising the temperature in cylinder 19 to a level above that which would be ordinarily achieved during the intake stroke. The increase in temperature that results from this internal exhaust gas recirculation will lead to a start of ignition that is earlier than would otherwise occur. In addition, the diluent brought via exhaust gas recirculation will lead to a combustion event having an expanded duration. It should be appreciated that intake valve 80 need not be opened to its maximum open position for this internal exhaust gas recirculation. Rather, intake valve 80 could instead be opened only slightly, so long as it is opened a sufficient distance to allow an adequate amount of exhaust gasses to be drawn into intake manifold 87. For instance, a sufficient amount of exhaust gasses could be drawn into cylinder 19 when intake valve actuator 83 is opened to less than half its maximum open distance.

In addition to internal exhaust gas recirculation utilizing variable valve timing of intake valve 80, variable valve timing of exhaust valve 90 could also be utilized. In this instance, electro-hydraulic assist exhaust actuator 93 could be activated to open exhaust valve 90 during a portion of the intake stroke of piston 20. Thus, relatively hot gasses from the exhaust manifold would be drawn into cylinder 20, resulting in an increase in cylinder temperature. Once again, diluent due to exhaust gas recirculation would result in an advanced ignition event and an expanded combustion duration. As with intake valve 80, electro-hydraulic assist exhaust actuator 93 does not need to open exhaust valve 90 to its fully open position to perform internal exhaust gas recirculation. Instead, electro-hydraulic assist exhaust actuator 93 need only open exhaust valve 90 to an open position sufficient to allow an adequate amount of exhaust gasses to be drawn back into cylinder 19.

To retard timing of the ignition event, the compression ratio within cylinder 19 can be reduced utilizing the variable valve timing of the present invention. Here, electro-hydraulic assist intake actuator 39 could be activated just prior to, or during, the compression stroke of piston 20, such that intake valve 80 will be opened, or remain open, for a portion of the compression stroke. By opening intake valve 80 during the compression stroke, the compression ratio will be lowered in cylinder 19 due to a delay in the start of compression. This reduced compression ratio will result in a later, or retarded, start of ignition. Once again, intake valve 80 need not be held to its fully open position during the compression stroke. Instead, intake valve 80 could only be opened slightly, so long as the compression ratio within cylinder 19 is sufficiently reduced.

Referring now to FIG. 6*a*, there is illustrated cam actuated movement of intake valve member 83 for four cycle operation of engine 10, as well as potential electro-hydraulic assist movement of intake valve member 83, versus crank angle for the present invention. As represented by area A, intake valve 80 will open during the intake stroke of piston 20 when rocker arm 29 is engaged by cam 37. However, it should be appreciated that intake plunger 40 is capable of engaging rocker arm 29 to open intake valve 80 for a period prior to the cam determined intake valve opening time (area B) or for a period beyond cam determined intake valve closing time (area C). In addition, it should be appreciated that electro-hydraulic assist intake actuator 39 could also open intake valve 80 during a portion of the power stroke and/or the exhaust stroke of piston 20, corresponding to area D of FIG. 6*a*. As illustrated, it should be appreciated that while intake valve member 83 can be moved by engagement of rocker arm 29 by intake plunger 40, it may not be opened, or held open, to its maximum open position, as indicated previously. The distance that intake valve member 83 is opened is dependent upon a number of factors, such as hydraulic pressure in intake plunger control passage 73, position of electro-hydraulic assist intake actuator 39 along rocker arm 29, and length of the moment arm as to where the plunger pushes on the rocker arm.

Referring to FIG. 6*b*, cam actuated movement of exhaust valve 90 for four cycle operation of engine 10, as well as potential electro-hydraulic assist movement of exhaust valve 90, have been illustrated versus crank angle for the present invention. As represented by area G, exhaust valve 90 will open during the exhaust stroke of piston 20 when rocker arm 92 is engaged by the exhaust cam. However, as with intake plunger 40, exhaust plunger 94 is capable of engaging rocker arm 92 to open exhaust valve 90 for a period prior to the cam determined exhaust valve opening time, corresponding to area F. In addition, electro-hydraulic assist exhaust actuator 93 could also open exhaust valve 90 during a portion of the intake stroke of piston 20 for internal exhaust gas recirculation, corresponding to area E. Once again, while exhaust valve 90 can be opened by engagement of rocker arm 92 by exhaust plunger 94, it may not be opened, or held open, to its maximum open position, as indicated previously. As with intake valve 80, the amount that exhaust valve 90 is opened is dependent upon a number of factors, such as hydraulic pressure acting on exhaust plunger 94 and the position of electro-hydraulic assist exhaust actuator 93 along rocker arm 92.

Industrial Applicability

Figure 7A:
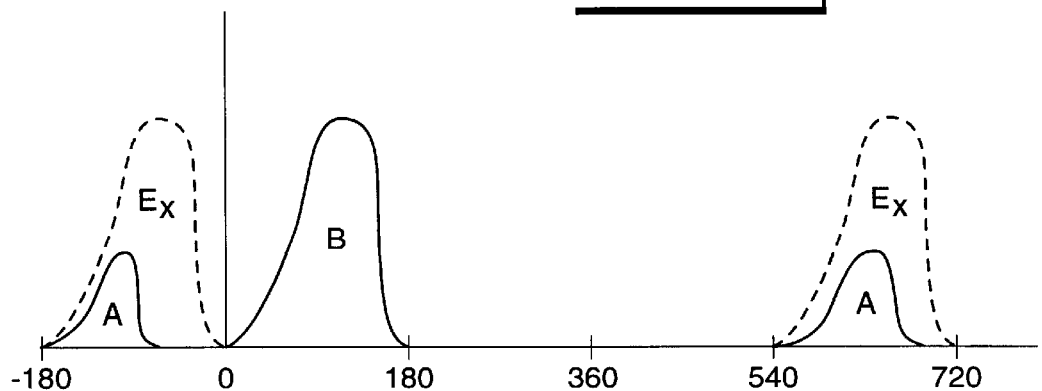
FIG. 7a is a graphical representation of intake valve position versus crank angle according to one aspect of the present invention.

Referring now to FIGS. 1–5, operation of engine 10 will be described during the four cycle operation of a single piston 20. Recall that while the present invention is being described for use with a four cycle engine 10, it should be appreciated that the present invention would also find applicability with two cycle engines. At some point prior to the intake stroke of piston 20, electronic control module 17 determines operating conditions of engine 10, such as load demand, manifold pressure, intake temperature, and mass air flow, and determines if timing of the next ignition event within cylinder 19 should be advanced or retarded, or if the duration of the ignition event should be expanded. If electronic control module 17 determines that the subsequent ignition should be advanced, or that the combustion duration should be expanded, electro-hydraulic assist intake actuator 39 can engage rocker arm 29, such that internal exhaust gas recirculation will occur in cylinder 19 during the exhaust stroke of piston 20, as represented by FIG. 7*a*. Alternatively, electro-hydraulic assist exhaust actuator 93 could be activated to engage rocker arm 92, such that internal exhaust gas recirculation will occur in cylinder 19 during the intake stroke of piston 20.

Figure 7B:
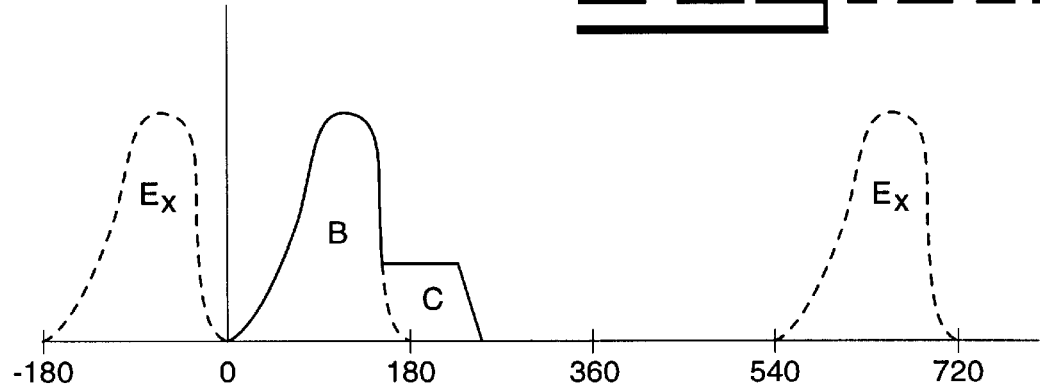
FIG. 7b is a graphical representation of intake valve position versus crank angle according to another aspect of the present invention.
Figure 7C:
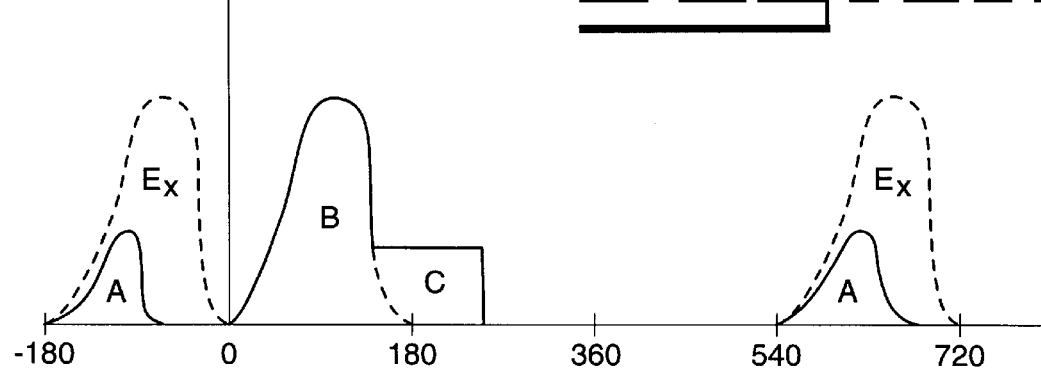
FIG. 7c is a graphical representation of intake valve position versus crank angle according to yet another aspect of the present invention.

If electronic control module 17 determines that timing of the ignition event should be retarded, the compression ratio within cylinder 19 will be lowered by electro-hydraulic assist intake actuator 39 holding intake valve 80 open after the cam determined valve closing time for a portion of the compression stroke of piston 20, as represented by FIG. 7*b*. For purposes of illustration, both of these events will be described for one four cycle iteration of piston 20 reciprocation, as represented by FIG. 7*c*. Thus, operation of engine 10 will be described for those operating conditions causing electronic control module 17 to determine that the combustion event duration should be expanded while the ignition event is retarded. However it should be appreciated that electronic control module 17 could determine that only one of internal exhaust gas recirculation or lowering of the compression ratio should occur for the subsequent ignition event. Further, electronic control module 17 could also determine that neither of these events should occur during the piston cycle.

Returning to engine 10, when piston 20 is moving upward for its exhaust stroke following an ignition event, solenoid 52 is actuated, such that pilot valve member 57 is moved toward its upward position, opening spool cavity 71 to low pressure passage 60 via variable pressure passage 61. With low pressure acting on control surface 70, spool valve member 63 is moved toward its downward position under the force of high pressure hydraulic fluid acting on high pressure surface 64. High pressure hydraulic fluid can now flow into device control passage 72 via high pressure annulus 65. High pressure hydraulic fluid in device control passage 72 can now flow into intake plunger control passage 73 to act on hydraulic surface 46 of outer plunger 41 and hydraulic surface 47 of inner plunger 42. Outer plunger 41 is now moved to its advanced position against stop component 48 and inner plunger 42 is moved to its advanced position to engage rocker arm 29, and to disengage the same from cam 37.

When intake plunger 40 is lifted to its upward position, rocker arm 29 moves in a corresponding manner, and pushes downward on valve bridge 36 to simultaneously move both intake valves. Intake valve member 83 is then moved to its downward open position by the downward movement of valve bridge 36. Referring now to FIG. 7c, which illustrates intake valve position versus crank angle, this opening of intake valve 80 during the exhaust stroke of piston 20 corresponds to area A. It should be appreciated that because piston 20 is undergoing its exhaust stroke, exhaust valve 90 will also be opened by the exhaust cam at this time, as illustrated in the dashed line portion of FIG. 7c corresponding to area $E_x$. Because piston 20 is moving toward the top dead center position for its exhaust stroke, an amount of relatively hot exhaust gas is pushed toward intake manifold 87 via intake passage 85 while intake valve 80 is open. Solenoid 52 of flow control valve 51 is then deenergized such that pilot valve member 57 is returned to its downward position closing spool cavity 71 to low pressure passage 60 and opening the same to high pressure passage 62. Spool valve member 63 is now hydraulically balanced, and returned to its upward position by biasing spring 68. Device control passage 72 is now reopened to low pressure passage 69 via low pressure annulus 67. With low pressure acting on hydraulic surfaces 46 and 47, outer plunger 41 and inner plunger 42 can be returned to their downward, retracted positions, followed by a corresponding movement of rocker arm 29. Intake valve member 83 is now returned to its upward, closed position by the valve return springs.

Once piston 20 reaches its top dead center position it begins to retract toward the bottom dead center position for its intake stroke. Cam 37 continues to rotate and engages rocker arm 29 to move it in a corresponding manner. Rocker arm 29 is moved toward its downward position by the rotation of cam 37, causing intake valve member 83 to move toward its downward position. Referring again to FIG. 7c, this opening of intake valve 80 corresponds to area B. The relatively hot exhaust gas that was pushed toward intake manifold 87 during the previous exhaust stroke flows back into cylinder 19 with the movement of intake valve member 83. The temperature within cylinder 19 is thus raised to a higher level than would have been achieved if only the cam actuated intake event had been allowed to occur. Higher temperature within cylinder 19 during the compression stroke of piston 20 will lead to an earlier combustion event. In addition, when internal exhaust gas recirculation is performed without a subsequent lowering of the compression ratio within cylinder 19, ignition timing will also be advanced.

Recall that the present invention is being illustrated for operation of engine 10 when combustion timing is to be controlled, while ignition timing is to be retarded. However, because the internal exhaust gas recirculation will advance ignition timing, in addition to expanding the combustion event, compression ratio within cylinder 19 should be lowered. Therefore, just prior to piston 20 reaching the bottom dead center position for its intake stroke, solenoid 52 is reenergized, causing pilot valve 57 to be moved to its upward position by armature 55. Spool cavity 71 is once again open to low pressure passage 60 via variable pressure passage 61. Spool valve member 63 can therefore return to its downward position under the force of hydraulic fluid acting on high pressure surface 64. High pressure fluid can now re-enter device control passage 72 via high pressure annulus 65. It should be appreciated that electro-hydraulic assist intake actuator 39 is preferably activated prior to the closing of intake valve 80, such that intake valve 80 merely remains open for a portion of the compression stroke of piston 20. Intake valve 80 could be allowed to close for the intake stroke and then be re-opened at some point during the compression stroke.

As piston 20 reaches the bottom dead center position for its intake stroke and begins to advance toward the top dead center position for its compression stroke, cam 37 continues to rotate. During those engine cycles where variable valve timing is not being used to reduce compression ratio within cylinder 19, intake valve member 83 would be returned to its upward closed position by the valve spring which causes movement of rocker arm 29. However, because intake plunger 40 is in its advanced position, rocker arm 29 is engaged by intake plunger 40 and disengaged from cam 37, preventing it from returning to a position closing intake valve 80. Intake valve 80 is thus open beyond the cam determined valve closing time. This portion of the operation of intake valve 80 corresponds to area C on FIG. 7c.

Once intake valve member 83 has been opened for an amount of time sufficient to reduce the compression ratio within cylinder 19, solenoid 52 is deenergized, and pilot valve member 57 is returned to its downward position opening high pressure seat 58, and fluidly connecting spool cavity 71 to high pressure passage 67 via variable pressure passage 61. It should be appreciated that this amount of time corresponds to engine operating conditions, such as manifold pressure and intake temperature. Spool valve member 63 is once again hydraulically balanced and returns to its upward position under the force of biasing spring 68. Device control passage 72, intake valve control passage 73 and inner plunger control passage 74 are once again opened to low pressure fluid via low pressure annulus 67. Outer plunger 41 and inner plunger 42 can now return to their downward positions, thus allowing rocker arm 29 to move in a corresponding manner and close intake valve 80.

As piston 20 is undergoing its compression stroke, the fuel that was injected into cylinder 19 mixes with the relatively hot air within cylinder 19 to form a relatively lean fuel mixture. As piston 20 reaches its top dead center position, the relatively lean fuel mixture ignites and causes piston 20 to move downward for its power stroke. Because internal exhaust gas recirculation and compression ratio reduction were performed, the start of ignition will occur at about the time that it would have occurred if neither of these events took place, while the combustion duration will be expanded to a desirable length. Once piston 20 reaches the bottom dead center position for its power stroke it begins to return to the top dead center position for the exhaust stroke. Exhaust valve 90 is opened by the rotation of cam 37, and the ignition residue can be removed from cylinder 19 via exhaust valve 90, corresponding to area $E_x$ of FIG. 7c. If electronic control module has determined that the subsequent ignition event should be advanced or expanded, electro-hydraulic assist intake actuator 39 will again be activated, and intake valve 80 will be opened for portion of the exhaust stroke of piston 20. If, however, electronic control module 17 determines that the subsequent ignition event does not need to be advanced or the combustion expanded in duration, intake valve 80 will not be open during the exhaust stroke to perform internal exhaust gas recirculation.

Recall that the previous illustration was described for operation of engine 10 when it is desirable to expand duration of the ignition event while retarding ignition timing. However, as previously discussed, for certain engine operating conditions it could be desirable to advance ignition timing, or to expand combustion duration without reducing compression ratio within cylinder 19. For these engine operating conditions, only internal exhaust gas recirculation will be performed during the engine cycle. Referring again to FIG. 7a, movement of intake valve member 83 versus crank angle has been illustrated for this operating condition. As in the previous example, intake valve 80 is opened during the exhaust stroke of piston 20 by electro-hydraulic assist intake actuator 39, corresponding to area A of FIG. 7a. Once again, the cam actuated movement of exhaust valve 90 has been illustrated as area $E_x$. Intake valve 80 then opens for its cam actuated intake event during the intake stroke of piston 20, corresponding to area B of FIG. 7a. However, because timing of the ignition event is not desired to be retarded, intake valve 80 is not held open beyond its cam actuated closing time, as previously disclosed. Thus, the increased temperatures within cylinder 20 that result from recirculation of exhaust gases will result in an advanced ignition event and an expanded combustion event.

Referring again to FIG. 7b, operation of intake valve 80 has also been illustrated for those cycles when ignition timing is to be retarded with no corresponding expansion of combustion duration. Thus, only compression ratio reduction will be performed for the engine cycle. As illustrated, intake valve 80 opens at its cam actuated intake valve opening time, corresponding to area B of FIG. 7b. However, as piston 20 nears the bottom dead center position of its intake stroke, electro-hydraulic assist intake actuator 39 is activated, and intake plunger 40 is moved to a position in which it can engage rocker arm 29. Thus, as rocker arm 29 is moved to its closed position by rotation of cam 37, it is engaged by intake plunger 40, and prevented from returning to a position closing intake valve 80. Thus, intake valve 80 is maintained in its open position beyond the cam determined intake valve closing time, corresponding to area C of FIG. 7b. The resultant lower compression ratio within cylinder 20 will result in a delayed, or retarded, ignition event.

It should be appreciated that various modifications could be made to the present invention. For instance, recall that ignition timing can also be advanced, and combustion duration extended, by performing internal exhaust gas recirculation using exhaust valve 90. Thus, instead of opening intake valve 80 during the exhaust stroke of piston 20, as previously disclosed, exhaust valve 90 can be opened during a portion of the intake stroke just prior to the compression stroke. It should therefore be appreciated that for operating conditions of engine 10 where expansion of combustion duration is desirable without advancing ignition timing, internal exhaust gas recirculation could be performed utilizing exhaust valve 90 while the compression ratio is reduced utilizing intake valve 80. To utilize the present invention in this manner, exhaust valve 90 could be opened by electro-hydraulic assist exhaust actuator 93 during the intake stroke of piston 20 to perform internal exhaust gas recirculation, as described previously, to increase the temperature within cylinder 19. Then, just prior to the compression stroke of piston 20, electro-hydraulic assist intake actuator 39 could be activated to hold intake valve 80 open for a portion of the compression stroke to reduce the compression ratio within cylinder 19.

Thus, those skilled in the art will appreciate that other aspects, objects and advantages of this invention can be obtained from a study of the drawings, the disclosure and the appended claims.

What is claimed is:

1. A homogeneous charge compression ignition engine comprising:
   an engine housing defining a plurality of engine cylinders, a piston disposed in each cylinder and reciprocating between a top dead center position and a bottom dead center position;
   a fuel injector associated with each engine cylinder and being operable to inject fuel into a respective engine cylinder when said piston is closer to said bottom dead center position than to said top dead center position;
   at least one intake valve associated with each said engine cylinder;
   a cam being sized and positioned to mechanically actuate said at least one intake valve; and
   an electro-hydraulic assist intake actuator being sized and positioned to mechanically actuate said at least one intake valve independent of a cam angle.

2. The engine of claim 1 wherein said at least one intake valve has a cam determined opening time and a cam determined closing time; and
   said electro-hydraulic assist intake actuator being capable of opening said at least one intake valve prior to said cam determined opening time and closing said intake valve after said cam determined closing time.

3. The engine of claim 1 including at least one cam actuated exhaust valve for each said engine cylinder, said at least one exhaust valve being operably coupled to an electro-hydraulic assist exhaust actuator.

4. The engine of claim 1 wherein said electro-hydraulic assist intake actuator includes a movable plunger;
   said plunger being positioned to mechanically engage said intake valve; and
   said plunger is movable from a retracted position to an advanced position when said electro-hydraulic assist intake actuator is energized.

5. The engine of claim 1 wherein said cam is mechanically engageable with said at least one intake valve via a mechanical linkage that includes a rocker arm assembly.

6. The engine of claim 5 wherein said rocker arm assembly includes a pivot; and
   said electro-hydraulic assist intake actuator is engageable with said rocker arm assembly a first distance from said pivot and said cam is engageable a second distance from said pivot.

7. A method of operating an engine, which includes an engine housing defining a plurality of engine cylinders, a piston disposed in each cylinder and reciprocating between a top dead center position and a bottom dead center position;
   a fuel injector associated with each engine cylinder and being operable to inject fuel into a respective engine cylinder when said piston is closer to said bottom dead center position than to said top dead center position;
   at least one intake valve associated with each said engine cylinder;
   a cam being sized and positioned to mechanically actuate said at least one intake valve; and
   an electro-hydraulic assist intake actuator sized and positioned to mechanically actuate said at least one intake valve, independent of a cam angle comprising the steps of:
   injecting fuel into an engine cylinder when a piston slidably disposed in the engine cylinder is closer to a bottom dead center position than a top dead center position;

holding at least one intake valve open, at least in part by rotating said cam; and adjusting ignition timing, at least in part by actuating the electro-hydraulic assist actuator.

8. The method of claim 7 wherein said step of adjusting ignition timing includes a step of retarding ignition timing, at least in part by activating said electro-hydraulic assist actuator to hold said at least one intake valve open beyond a cam determined intake valve closing time.

9. The method of claim 7 wherein said step of adjusting ignition timing includes a step of advancing ignition timing, at least in part by activating said electro-hydraulic assist actuator to open said at least one intake valve prior to a cam determined intake valve opening time.

10. The method of claim 7 including a step of expanding combustion duration, at least in part by activating said electro-hydraulic assist actuator to open said at least one intake valve prior to a cam determined intake valve opening time.

11. The method of claim 10 wherein said step of adjusting ignition timing includes a step of activating said electro-hydraulic assist actuator to hold said at least one intake valve open beyond a cam determined intake valve closing time.

* * * * *